2,802,820
Patented Aug. 13, 1957

2,802,820

CONDENSATION PRODUCTS OF SECONDARY HEXITYL AMINES, FORMALDEHYDE AND PHENOLS

John D. Zech, Wilmington, Del., assignor to Atlas Powder Company, Wilmington, Del., a corporation of Delaware No Drawing. Application February 18, 1953,
Serial No. 337,691

4 Claims. (Cl. 260—211)

The present invention relates to condensation products formed by the inter-action of a secondary hexityl amine, formaldehyde and a phenol, and to a process for making the same.

It is an object of the invention to provide the named condensation products as new compositions.

Another object is to provide a process for making the condensation products.

A specific object is to provide condensation products of N-methyl glucamine, formaldehyde, and a phenol.

The above and other objects will become apparent in the course of the following description.

The products of the invention have novel properties making them suitable for a variety of uses. By reason of their reactive groups they are useful as chemical intermediates. Particular compounds of the class are useful as surface active agents, anti-static agents, corrosion inhibitors, antioxidants, textile sizes, lubricant additive, deodorants, germicides, or synthetic resins.

The term "hexityl amine" is used herein to define the group of compounds having the structure of hexitols with one hydroxyl group replaced by an amino group. Hexityl amines are preferably made by the simultaneous reaction of ammonia, or a primary amine, and hydrogen on a hexose by methods well known to the art.

The compounds of the invention are, fundamentally, tertiary hexityl amines containing phenolic hydroxyl-bearing radicals of phenols linked by ring carbon through a methylene radical to the hexitylamine N atom. Where the phenol is poly-reactive to formaldehyde and appropriate reactant proportions are employed, polycondensation occurs yielding more complex products which, however, contain the same basic structural units. A simple mono-condensation product may be represented as follows:

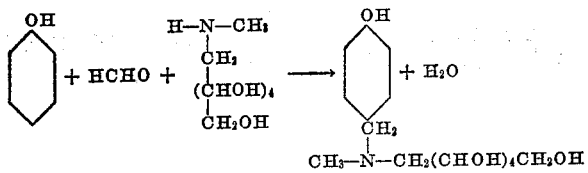

A polycondensation product may be represented as follows:

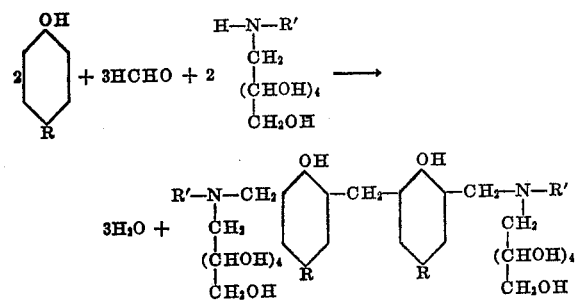

wherein, R is a monovalent ring substituent, and R' is a monovalent organic radical linked through carbon to the nitrogen atom of the hexityl amine.

Phenols useful in making the compounds of the invention are those having at least one unsubstituted ortho or para position reactive with formaldehyde. To make polycondensation products the phenols must have at least two formaldehyde-reactive positions open. Examples of suitable phenols are phenol, o-cresol, m-cresol, p-cresol, o-ethyl phenol, p-isopropyl phenol, o-chlorophenol, 2,4-dichoro phenol, p-tert. butyl phenol, p-tert. amyl phenol, p-tert. butyl-o-cresol, p-octyl phenol, diamyl phenol, p-nonyl phenol, di-nonyl phenol, alpha-naphthol, beta-naphthol, p-phenyl phonel, resorcinol, hydroquinone, 2,2-di (4-hydroxyl phenyl) propane, cresylic acids, and xylenols.

Suitable hexitylamines are the secondary hexitylamines. Examples of this class are N-methyl glucamine, N-methyl fructamine, N-ethyl glucamine, N-butyl glucamine, N-benzyl glucamine, N-2 hydroxy ethyl glucamine, N-2 hydroxy propyl glucamine, N-lauryl glucamine, N-cetyl glucamine, and N-octadecyl glucamine.

The basic reaction to form the monocondensation products is illustrated by the first equation above. Required is a phenol having at least one formaldehyde-reactive ortho or para position. Where only one such position is open the reaction occurs in the proportion one mol of phenol to one mol of formaldehyde to one mol of the secondary hexitylamine. With phenols having more than one reactive ortho or para positions one mol of secondary hexitylamine may be used for each reactive position, the amount of formaldehyde being equivalent to the amount of hexitylamine used. If desired the amount of formaldehyde used can be in excess of the amount of hexitylamine used provided the amount of hexitylamine used was not sufficient to react with all of the reactive positions of the phenol. A reaction of this type is illustrated in the second equation set forth above. This type of condensation may be carried out in stages. For example, the first stage may be the condensation of the hexitylamine, phenol and formaldehyde under alkaline conditions, and the second stage may be the condensation of the first condensation product with additional formaldehyde under alkaline or acid conditions to yield the final product.

These new tertiary hexitylamines in general are resinous in nature, those derived from phenol and N-methyl glucamine being generally water soluble. Higher alkyl groups on the phenol or hexitylamine lower the water solubility of the products and increase their solubility in organic solvents. These products form salts with organic and with mineral acids. They may be quaternized with organic halides, di-alkyl sulfates, etc. to form quaternary ammonium derivatives.

They may be used as modifiers for synthetic resins such as phenol formaldehyde resins, urea and melamine formaldehyde resins, epoxy resins such as the Epon resins derived from epichlorohydrin and dihydric phenols, etc.

In the case of formaldehyde resins the products of this invention can be prepared under conditions leaving reactive methylol groups and copolymerized with un-cured phenol, urea or melamine-formaldehyde resins which likewise contain reactive methylol groups. The copolymers can likewise be prepared by including the secondary hexityl amine as an initial reactant with the phenol, urea or melamine and the formaldehyde, increasing the proportion of formaldehyde to provide for the reactivity of the hexityl amine. Another mode of introducing secondary hexityl amines into such resins is to prepare an initial condensation product of the phenol, urea or melamine and formaldehyde, using an excess of formaldehyde, and then react the condensate with the secondary hexitylamine. These several condensations and copolymerizations can take place under acid or alkaline conditions and temperatures conventional in these resin arts.

The introduction of a hexityl amine radical into synthetic resins of these types brings into the resin structure a polyhydroxylic group that acts to modify the solvent behavior of the uncured resins and the mechanical properties of the cured resins. The hydroxylic groups can also be reacted with fatty acids, alkylene oxides etc. to cause further modification of the properties of the resins.

Another alternative procedure for the preparation of these products in two stages is to condense formaldehyde with phenol under alkaline conditions to form methylol phenols which may then be condensed with the secondary hexityl amines. In this two stage process, the amount of hexityl amine used may be equivalent to the methylol groups or it may be less than this amount but in no case should it be in excess of the methylol groups of the methylol phenols.

The following examples illustrate the products and process of the invention.

The procedure followed in the preparation of these porducts was to charge the reactants and solvent to a suitable reaction flask fitted with a stirrer, thermometer and reflux condenser. The reaction mixture was refluxed for the time indicated after which the solvents and water were distilled off finally under high vacuum leaving the product as a residue. The formaldehyde used was a 37% aqueous solution but other forms such as solutions in alcohols or paraformaldehyde can also be used.

spread on glass and baked in an oven at 128° C. for one hour and forty minutes. It converted to a clear hard insoluble and infusible coating.

The bisphenol-formaldehyde resin sirup was made by reacting 3.1 moles of aqueous formaldehyde with one mol of bisphenol A, 2,2 bis (p-hydroxy phenyl) propane, under alkaline conditions.

Instead of the phenols employed in these examples other substituted phenols as described above may be employed on an equivalent basis. Likewise other hexityl amines of the class described above may be substituted for N-methyl glucamine on an equivalent basis.

What is claimed is:

1. A condensation product of a secondary hexitylamine, formaldehyde, and a phenol having at least two formaldehyde reactive positions open, the proportions of reactants being one mole of said phenol, at least one mole of said hexityl amine but less than one mole per said open reactive position, and more than one mole of formaldehyde but not more than one mole per said open reactive position.

2. A condensation product of N-methyl glucamine, formaldehyde and the specific compound phenol in reacting proportions of one mole of phenol to three moles each of formaldehyde and N-methyl glucamine.

3. A condensation product of N-methyl glucamine, formaldehyde and p-tert. butyl phenol in reacting proportions of one mole of p-tert. butyl phenol to two moles each of formaldehyde and N-methyl glucamine.

4. The process which comprises condensing together a secondary hexityl amine, formaldehyde and a phenol hav-

| Example | Grams Phenol Used | Phenol Used | Grams HCHO | Form of HCHO | Grams N-methyl glucamine | CC. solvent | Solvent Used | Reaction Time, hrs. | Reaction Temp., ° C. | Grams product | Remarks |
|---|---|---|---|---|---|---|---|---|---|---|---|
| 1 | 110 | nonyl | 15 | aqueous | 99 | 200 | ethanol | 2⅜ | 82 | 213 | water insoluble, resinous. |
| 2 | 32 | phenol | 30.5 | do | 200 | 300 | isopropanol | 6¾ | 83 | 243 | water soluble, resinous. |
| 3 | 82.5 | octyl | 13 | do | 82.5 | 275 | do | 4¼ | 83 | 168 | water insoluble, resinous. |
| 4 | 54.5 | p. tert. butyl | 23 | do | 152 | 195 / 25 | do / methanol | 3 | 84 | 216 | water soluble, resinous. |
| 5 | 54 | p. cresol | 30 | do | 195 | 200 | isopropanol | 4 | 84 | 261 | Do. |

6. Reaction of a methylol phenol (o-hydroxybenzyl alcohol) with methyl glucamine.

39 g. of methyl glucamine was melted and 25 g. of o-hydroxy benzyl alcohol was stirred in gradually during several minutes. The mixture which was clear and homogeneous was heated several hours on the steam bath and then allowed to cool. It was a clear soft resinous solid, which crystallized after standing several days.

7. Reaction of a bisphenol-formaldehyde resin with methyl glucamine.

110 g. of a bisphnenol-formaldehyde resin sirup (75% solids) was mixed with 45 g. of methyl glucamine and 30 cc. methanol. The mixture was heated about 5 minutes on the steam bath to get a clear solution which remained clear on cooling. A film of this solution was ing at least two formaldehyde reactive positions open, the proportions of reactants being one mole of said phenol, at least one mole of said hexityl amine but less than one mole per open reactive position of said phenol, and more than one mole of formaldehyde but not more than one mole per open reactive position of said phenol.

References Cited in the file of this patent

UNITED STATES PATENTS 2,268,126    Orthner et al.    Dec. 30, 1941
2,294,379    Bley    Sept. 1, 1942

OTHER REFERENCES

Karrer et al.: Chem. Abs., 30, 1796–7 (1936) Org. Reactions I, 311 (1942).